April 3, 1956   P. ZAY ET AL   2,740,674
CAGE FOR BALL AND LIKE BEARINGS
Filed April 10, 1953   2 Sheets-Sheet 1

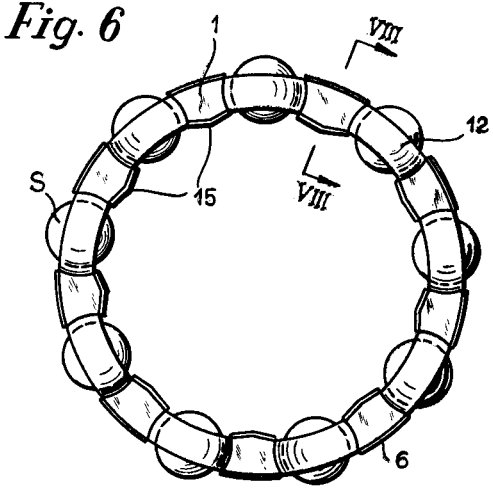
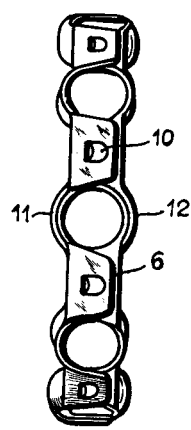
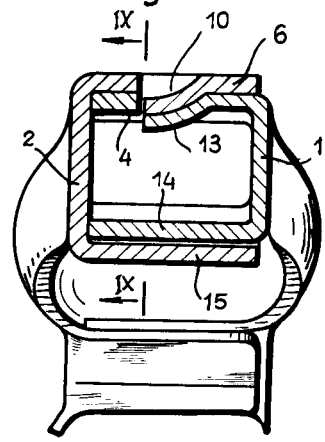
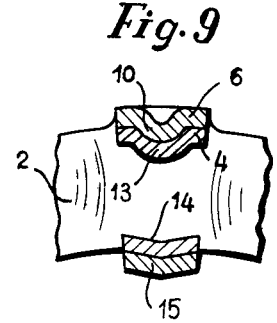

United States Patent Office 2,740,674
Patented Apr. 3, 1956

2,740,674
CAGE FOR BALL AND LIKE BEARINGS
Pietro Zay and Amedeo Ferretto, Turin, Italy
Application April 10, 1953, Serial No. 348,042
Claims priority, application Italy April 17, 1952
2 Claims. (Cl. 308—201)

This invention relates to a cage for ball and roller bearings.

It is an object of this invention to provide a cage for a bearing of the abovementioned type, which is made up of two opposite pressed sheet metal members assembled together by snap action and formed with openings for providing seats guiding the rolling members.

Each cage member comprises a portion of annular rim shape, which is externally formed for containing the balls, and a flanged cylindrical portion provided with openings forming wings which are adapted to interengage on assembly by a snap action with the wings of the opposite cage member.

The wings on one cage member are provided with projecting tongues, the wings on the other cage member being formed with suitable recesses accommodating the tongues on the first mentioned cage member, for causing the two cage members to engage together by snap action.

According to a modification, the seats for the balls are obtained by forming in each cage member outwardly directed spherical recesses. The reciprocal position of the two cage members for insuring an accurate spacing between the facing spherical recesses then results from the front abutment of the wings which are positioned internally against the annular surface of the opposite cage member.

Reciprocal engagement by snap action and accurate angular adjustment of the cage members may be completed by a further row of inwardly directed wings, preferably of a widely diverging V-section.

The invention will be described in detail with reference to the accompanying drawings which show by way of example some embodiments thereof.

Figure 6 is a front view of a modified cage construction,

Figure 7 is a side view of Figure 6,

Figure 8 is a section on an enlarged scale on line VIII—VIII of Figure 6,

Figure 9 is a section on line IX—IX of Figure 8.

Figure 1:
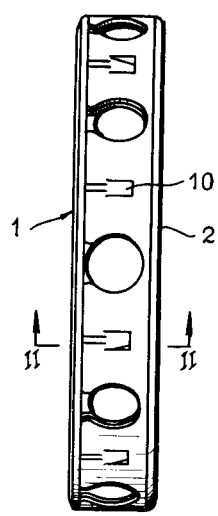
Figure 1 is an elevation of a cage for radial ball bearings.
Figure 2:
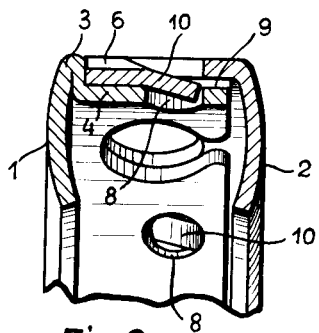
Figure 2 is a section on an enlarged scale on line II—II of Figure 1.
Figure 3:
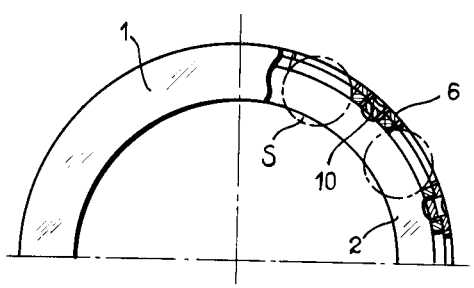
Figure 3 is a part sectional front view of the cage.
Figure 4:
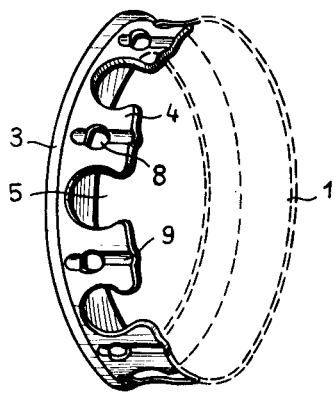
Figures 4 and 5 are perspective views of the two cage members.
Figure 5:
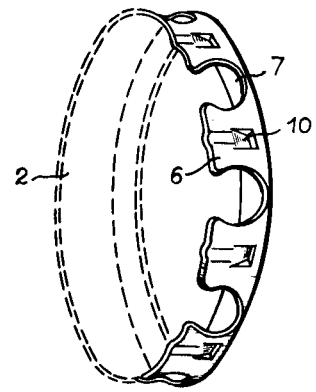

Referring to Figures 1 to 5, the cage is made up of two pressed sheet metal members 1 and 2 of annular shape. The cage member 1 is provided with a flanged cylindrical portion 4 merging into the substantially flat portion 1 by means of a ridge 3. Openings 5 of circular shape accommodating the balls are cut in the surface 4.

A flanged cylindrical portion 6 is provided on the cage member 2 and directly merges into the annular portion 2, circular openings 7 similar to the openings 5 being cut in said cylindrical portion 6.

The cage members 1 and 2 are assembled together by reciprocal engagement of the cylindrical portions 4 and 6, the openings 7 coming in front of the openings 5 to form the seats for the balls S.

The cylindrical surfaces 4 and 6 in which the slits are cut each take the form of a set of wings.

The wings 4 of the cage member 1 are formed with holes 8 and grooves 9 turned inwardly and extending parallel with the bearing axis, while tongues 10 directed inwardly are cut in the ribs 6 on the cage member 2 and are adapted to snap into the holes 8 in the cage member 1, said tongues 10 being previously guided during assembly along the grooves 9, for the sake of an accurate angular positioning of the cage members and interengagement thereof by snap action.

Assembly of the two cage members is made possible by the fact that the flanged cylindrical portions in which the slits are cut each take the form of a set of wings and can be resiliently deformed to allow of the projecting tongues to fit into their seats 8.

The ridge 3 formed on the cage member 1 serves as an abutment for the cylindrical portion 6 on the cage member 2, in order to accurately shape the circular seats for the balls.

In the modification shown in Figures 6 to 9, recesses 11, 12 of outward spherical shape are formed in the annular portions of the cage members 1 and 2.

The recesses are formed at the portions located between the wings 4 and 6 of both cage members and form the seats for accommodating and guiding the balls.

The wings 4 on the cage member 1 have cut therein inwardly directed tongues 13 forming seats into which the tongues 10 in the wings 6 on the case member 2 snap.

The annular surfaces 1 and 2 are moreover provided with wings 14, 15, respectively, on the inside at the intervals between the recesses 11 and 12, of a widely open V-section.

The wings 14, 15 complete the angular reference for the two cage members, whereby the opposite spherical recesses 11 and 12 are caused to mate accurately.

Accurate spacing in an axial direction of the two cage members is determined by the front abutment of the wings 4 and 14 on the cage member 1 against the annular portion on the cage member 2.

What we claim is:

1. A cage for ball bearings, consisting of two separate cooperating annular members each comprising a side wall having a number of equal semi-spherical formations spaced from each other by substantially radially extending equal sectors for forming together with the semi-spherical formations of the other member a seating for the balls of the bearing, the sectors of each of said members being provided with two rows of axially extending superimposed and radially spaced lips, said members being assembled with said lips of one member overlapping corresponding lips of the other member, cooperating snap acting means on each pair of superimposed radially outer lips maintaining said members in proper assembled condition, the radially inner lips of one member being provided with axial grooves in their outer surface and the radially inner lips of the other member overlapping the first mentioned lips are provided with ribs for engaging said grooves, whereby means for guiding to their accurate reciprocal positions of the two members during assembly are provided on each pair of said superimposed radially inner lips.

2. A cage as claimed in claim 1, wherein the cooperating radially inner lips of the two members are of equal length and are V-shaped in cross section, the cross-sectional shape of each lip on one member being complementary with the shape of each lip on the other member.

References Cited in the file of this patent

UNITED STATES PATENTS

| | | |
|---|---|---|
| 788,488 | Miller | Apr. 25, 1905 |
| 796,648 | Hirth | Aug. 8, 1905 |
| 1,089,877 | Stahl | Mar. 10, 1914 |
| 1,169,469 | Dunning | Jan. 25, 1916 |
| 1,518,731 | Dickinson | Dec. 9, 1924 |

FOREIGN PATENTS

| | | |
|---|---|---|
| 42,706 | Sweden | Aug. 18, 1914 |